US005536458A

United States Patent [19]

Kawakita et al.

[11] Patent Number: 5,536,458

[45] Date of Patent: Jul. 16, 1996

[54] METHOD OF MOLDING TWO-COLOR POLYURETHANE PARTS BY RIM

[75] Inventors: Yukio Kawakita; Shogo Sugiyama; Naohisa Nagasaka, all of Aichi, Japan

[73] Assignee: Toyoda Gosei Co., Ltd., Nishikasugai-gun, Japan

[21] Appl. No.: 357,991

[22] Filed: Dec. 16, 1994

Related U.S. Application Data

[63] Continuation of Ser. No. 117,678, Sep. 8, 1993, abandoned.

[30] Foreign Application Priority Data

Oct. 30, 1994 [JP] Japan .................................... 4-315845

[51] Int. Cl.[6] ........................................ B29C 44/06

[52] U.S. Cl. .................................... 264/46.600; 264/46.9; 264/102; 264/245; 264/246; 264/328.2; 264/328.8; 264/DIG. 78; 264/45.5; 521/50; 521/51

[58] Field of Search .................................... 264/240, 245, 264/328.2, 328.6, 328.8, 328.18, 328.19, 45.1, 45.4, 46.6, 46.9, 101, 102, 246, DIG. 78, 45.5; 521/50, 51

[56] References Cited

U.S. PATENT DOCUMENTS

| | | | |
|---|---|---|---|
| 4,420,570 | 12/1983 | Dominguez | 264/328.2 |
| 5,114,637 | 5/1992 | Williams et al. | 264/328.8 |
| 5,300,532 | 4/1994 | Takimoto et al. | 264/4.5 |
| 5,449,698 | 9/1995 | Mabuchi et al. | 521/51 |
| 5,464,582 | 11/1995 | Okano et al. | 264/45.5 |
| 5,476,619 | 12/1995 | Nakamura et al. | 264/45.5 |

FOREIGN PATENT DOCUMENTS

| | | | |
|---|---|---|---|
| 0295529 | 12/1988 | European Pat. Off. . | |
| 0461522 | 12/1991 | European Pat. Off. . | |
| 2140076 | 5/1972 | France . | |
| 3640474 | 6/1988 | Germany . | |
| 61-37406 | 2/1986 | Japan | 264/240 |
| 63-21110 | 1/1988 | Japan | 264/240 |
| 7702676 | 3/1977 | Netherlands . | |
| WO88/00876 | 2/1988 | WIPO | 264/328.2 |

OTHER PUBLICATIONS

Modern Plastics International, Apr. 15, 1985, No. 4, Lausanne, Switzerland, pp. 58–60.

Patent Abstracts of Japan, JP58201621, Nov. 24, 1983, page 1.

*Primary Examiner*—Mathieu D. Vargot
*Attorney, Agent, or Firm*—Cushman Darby & Cushman

[57] ABSTRACT

It is object of the present invention to provide a method by which a variable property component, such as two-color parts, having the interior covered with a thin film of the surface area is molded from polyurethanes by RIM, eliminating the need for separately applying a mold release agent or colorants to the cavity surface. Greater latitude in design due to varying physical characteristics is provided.

6 Claims, 7 Drawing Sheets

METHOD OF MOLDING TWO-COLOR POLYURETHANE PARTS BY RIM

This is a continuation of application No. 08/117,678 filed on Sep. 8, 1993, which was abandoned upon the filing hereof.

BACKGROUND OF THE INVENTION

The present invention relates to a method of molding a polyurethane product which has variable physical properties, such as, different colors, hardness, etc. between the outer and inner portions. The polyurethane materials applicable in the present invention are those which are known to those skilled in reaction-injection molding (RIM) methods.

The conventional RIM technology for molding polyurethane parts includes applying a mold release agent to the surface of the mold cavity. If necessary, an insert is set in the cavity of the mold. A RIM polyurethane material is then injected into the cavity so that the respective components will react to cure; and the mold is opened and the molded part is removed.

Among these steps, the application of the mold release agent accounts for a large portion of the molding cycle and hence, it is an impediment to reducing the cycle time. Furthermore, the use of a single type of RIM polyurethane material makes it difficult to provide different properties in the surface and the interior of the molded part (providing different blow ratios is all that can be presently accomplished). It has been impossible to achieve free alterations in various characteristics such as a feeling of touch and endurance. Although polyurethane molding by RIM is sometimes done after pigment-containing polyurethane materials (colorants) can be applied to the surface of the mold cavity, such an application step is time- consuming.

SUMMARY OF THE INVENTION

An object of the present invention is to provide a novel method of molding variable property polyurethane parts by RIM, such that, for example, two-color parts having an interior portion covered with a thin surface film throughout the surface area. Further, the present invention provides for incorporation of commonly used components in the surface forming operation such that the overall RIM process may be simplified. For example, if a mold release agent is incorporated in the surface area forming operation, a separate step of applying the agent may be omitted; if a desirable colorant is incorporated in the surface forming operation, a separate step of applying the colorant may be omitted; furthermore, if a predetermined catalyst is incorporated in the surface forming operation, or if some other suitable component is adopted to provide different properties in the surface area and the interior, the latitude in changing various characteristics such as a feeling of touch and endurance can be enhanced.

Broadly described, the method of molding differential property, such as two-color, polyurethane parts by RIM according to the present invention entails filling the cavity of a mold under vacuum with a small amount of a surface forming RIM polyurethane material followed by filling the cavity with an interior forming RIM polyurethane material for subsequent molding by RIM. In a preferred embodiment, the surface forming RIM polyurethane material contains at least one auxiliary component selected from among a colorant, a mold release agent or a catalyst such that differential properties are attained by inclusion or application of the auxiliary component.

For selective injection of the two types of RIM polyurethane material (one for forming the surface area and the other for forming the interior) according to the present invention, one of the following four methods, for example, may be employed.

(1) Using a three-component mixing head, the principal components (i.e., a polyol component and an isocyanate component) and an auxiliary component are delivered into a mixing chamber where they are mixed by impingement and the resulting mixture is injected in a small amount as the surface forming RIM polyurethane material. Then, the delivery of the auxiliary component is ceased and the polyol and isocyanate components are similarly mixed by impingement before injection of the interior forming RIM polyurethane material.

(2) Using a three-component mixing head, the passageway for a third component which is one of the auxiliary components is controlled in such a way that a fourth component which is a further auxiliary component is charged into the exit portion of the mixing chamber. First, the principal components (i.e., the polyol and isocyanate components) and the charged fourth component are delivered into the mixing chamber. First, the principal components (i.e., the polyol and isocyanate components) and the charged fourth component are delivered into the mixing chamber where they are mixed by impingement and the resulting mixture is injected as the surface forming RIM polyurethane material. If there is no fourth component left, the third component will be delivered spontaneously and the three components (i.e., the third component and the polyol as well as isocyanate components) are similarly mixed by impingement before injection as the interior forming RIM polyurethane material.

(3) Using a four-component mixing head, the principal components (i.e., the polyol and isocyanate components) and a fourth component, which is one of the auxiliary components, are delivered into the mixing chamber where they are mixed by impingement and the resulting mixture is injected in a small amount as the surface forming RIM polyurethane material. Then, the delivery of the fourth component is ceased and the polyol and isocyanate components as well as the third component which is the other auxiliary component are similarly mixed by impingement before injection as the interior forming RIM polyurethane material.

(4) By adjusting the pump delivery of the polyol or isocyanate component to the mixing head, the mixing ratio of the two principal components is varied before they are injected successively as the surface or interior forming RIM polyurethane material.

According to the method of the present invention, two-color parts, for example, the interior of which is covered with a thin film on its outer surface can be molded by RIM from polyurethane. Although the mechanism of the present invention is not completely understood, it is believed that when the cavity of a mold under vacuum is filled with a small amount of the surface forming RIM polyurethane material, the injected polyurethane material, as it undergoes a sudden drop in pressure from the existing pressurized state, scatters within the cavity and is deposited in a thin film on the surface of the cavity, thereby forming the outer surface layer of the two-color part to be eventually molded. When the interior forming RIM polyurethane material is thereafter injected into the cavity, the injected polyurethane material fills the cavity and its components react to cure, forming the interior of the two-color part. As a result, there is molded the two-color part; the interior of which is covered with the thin film on the outer surface layer.

In a preferred embodiment, at least one auxiliary component selected from, for example, a colorant, a mold release agent and a catalyst may be mixed with the surface forming RIM polyurethane material. This is effective in ensuring that the eventually molded two-color part can be easily rendered to have different colors, properties, etc., in the surface area and the interior. Stated specifically, better release of the molded part is achieved by mixing a mold release agent with the polyurethane material. When a colorant is mixed, the colored surface area will effectively mask the interior of the molded part. If a catalyst is mixed to control a certain quality such as endurance, hardness or foam density, different properties can be produced in the surface area and the interior.

DETAILED DESCRIPTION OF THE INVENTION

Figure 1:
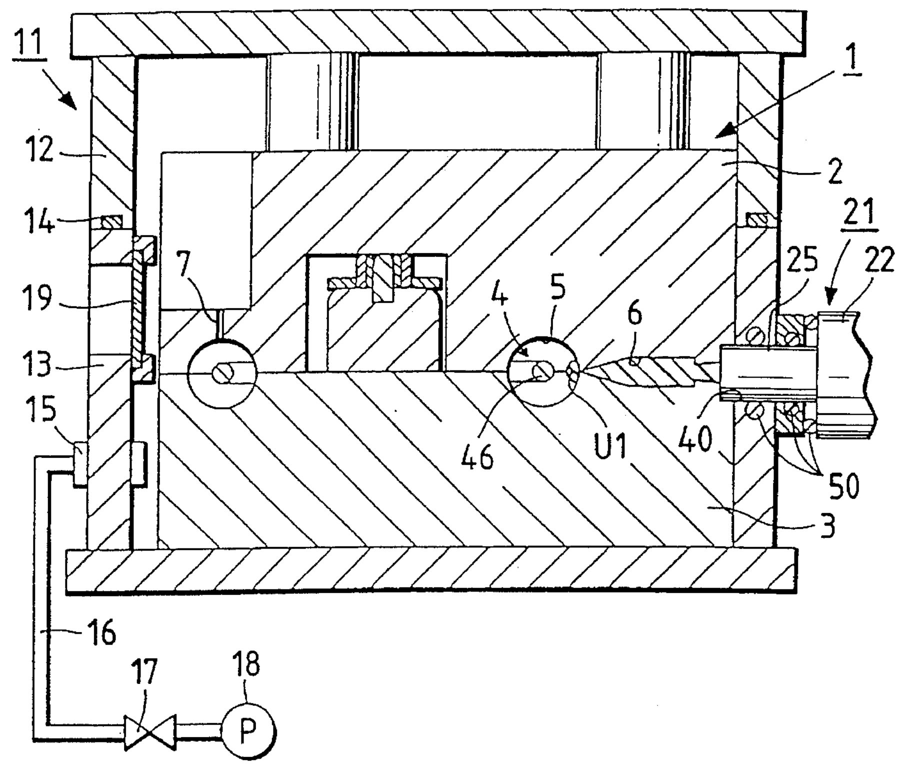
FIG. 1 is a cross-sectional view showing the step of forming the surface area of a polyurethane coating on a steering wheel in an embodiment according to the present invention.

The present invention will be further described in the following illustrative embodiments.

A first embodiment according to the present invention provides a steering wheel produced is described below with reference to FIGS. 1 to 10. The molding apparatus to be used in this embodiment comprises, basically, a mold 1, a vacuum box 11 and a feed injection mechanism 21 as shown in FIGS. 1 to 7. These basic parts of the molding apparatus are described below in further detail.

The mold 1 consists of two split parts, an upper mold 2 and a lower mold 3. The parting line (PL) between the two molds is provided with a cavity surface 5 that forms an annular cavity 4 upon mold closing and a feed passageway 6 to the cavity 4. A venthole 7 is formed in the upper mold 2 at the position where it is to be finally filled with a polyurethane material.

The vacuum box 11 consists of two split parts, an upper box 12 and a lower box 13. The upper box 12 contains the upper mold 2 and the lower box 13 contains the lower mold 3. The upper box 12 and the lower box 13 are fitted on a clamping unit (not shown). In the embodiment under consideration, the lower box 13 will move up and down, so that the vacuum box 11 is opened and closed in synchronism with the opening and closing of the mold 1. An O-ring 14 is fitted in a groove formed in the parting face of the upper box 12; when the vacuum box 11 is closed, the O-ring 14 will contact the parting face of the lower box 13 so as to seal the space between the upper and lower boxes.

The lower box 13 is fitted with a suction plug 15 which is connected via a suction hose 16 and a valve 17 to a vacuum pump 18. The lower box 13 is also furnished with an inspection window 19 that is provided to ensure airtightness and through which the area around the venthole 7 can be seen from the outside of the vacuum box 11.

Figure 5:
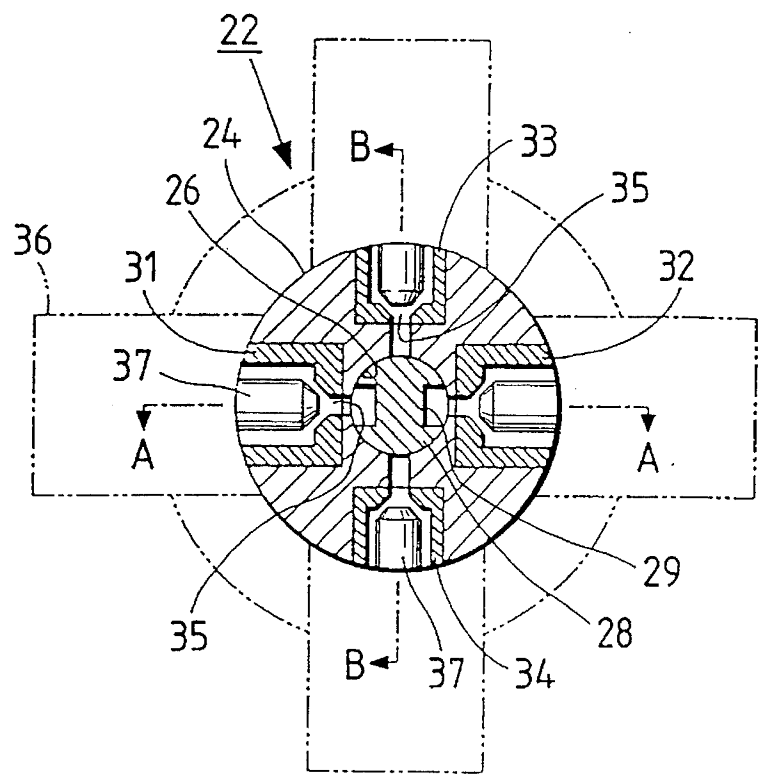
FIG. 5 is a cross-sectional view of the mixing head in molding the polyurethane coating.
Figure 6:
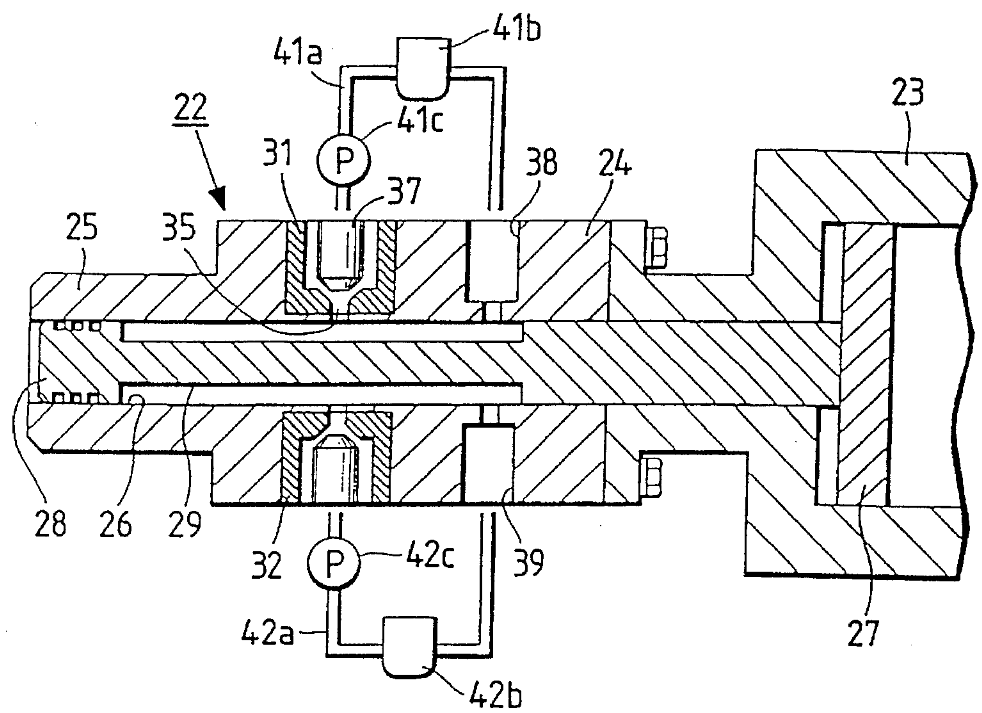
FIG. 6 is a cross section taken on line A—A of FIG. 5.
Figure 7:
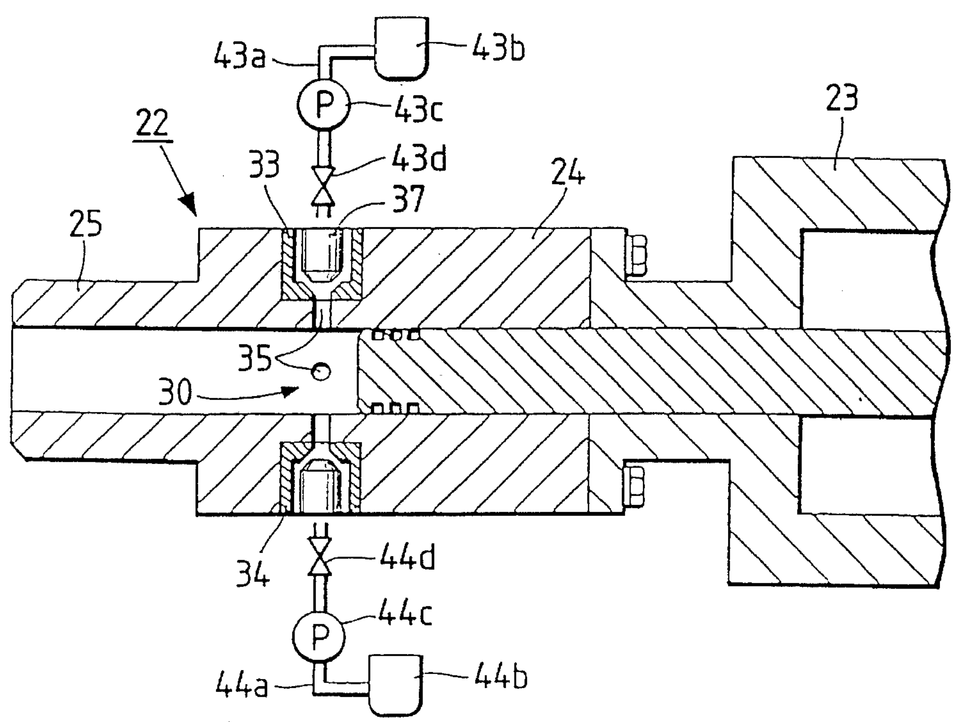
FIG. 7 is a cross section taken on line B—B of FIG. 5.

The feed injection mechanism 21 is furnished with a four-component mixing head 22 of the type shown in FIGS. 5 to 7 and it is adapted to ensure that the principal components (i.e., the polyol and isocyanate components) are selectively mixed with either on of the auxiliary components (i.e., the third or fourth component). The four- component mixing head 22 comprises a cylinder 23 and a body 24 fitted to its distal end. The body 24 has a slender injection nozzle 25 at the tip.

A through-hole 26 is formed in the center of the box 24 and a spool 28 fitted on a piston 27 in the cylinder 23 is slidably inserted into the hole 26. A pair of longitudinally extending grooves 29 are formed in diametric positions on the periphery of the spool 28. In response to the reciprocating motion of the piston 27, the spool 28 slides either to the advanced position shown in FIG. 6 or to the retracted position shown in FIG. 7. When in the retracted position, the spool 28 has in front of it a mixing compartment 30 where the necessary components of the feed are to be mixed together in the manner to be described hereinafter.

The body 24 has in its interior a polyol component supply nozzle member 31 on the left side (see FIG. 5) which is disposed to face an isocyanate component supply nozzle member 32 on the right side. The body 24 also has in its interior a third component supply nozzle member 33 in the upper portion (also see FIG. 5) which is disposed to face a fourth component supply nozzle member 34 in the lower portion. Each of the four nozzle members is in a cylindrical shape and has a tapered orifice 35 formed in such a way that it opens to the mixing compartment 30 or elongated grooves 29. A holder 36 of the nozzle members 31 to 34 is fitted around the body 24 and needles 37 are inserted into the holder in such a way that their tips will control the degree of opening of the orifices 35. Next to the nozzle members 31 and 32 in the body 24, there are formed a polyol component returning hole 38 and an isocyanate component returning hole 39, both of which are open to the elongated grooves 29.

The nozzle member 31 and the return hole 38 are connected via hose 41*a* to a polyol component tank 41*b* and pump 41*c*, thereby forming circulation path of the polyol component (tank 41*b* pump 41*c* nozzle member 31 elongated groove 29 return hole 38 tank 41*c*). The nozzle member 32 and the return hole 39 are also connected via hose 42*a* to an isocyanate component tank 42*b* and pump 42*c*, thereby forming a circulation path of the isocyanate component (tank 42*b* pump 42*c* nozzle member 32 elongated groove 29 return hole 39 tank 42*b*).

The nozzle member 33 is connected via hose 43*a* to a third component tank 43*b*, pump 43*c* and valve 43*d*, thereby forming a one-way supply path (tank 43*b* pump 43*c* valve 43*d* nozzle member 33). The nozzle member 34 is also connected via hose 44*a* to a fourth component tank 44*b*, pump 44*c* and valve 44*d*, thereby forming a one-way supply path (tank 44*b* pump 44*c* valve 44*d* nozzle member 34).

The injection nozzle 25 on the four- component mixing head 22 penetrates a through-hole 40 in the lower box 13 to be connected to the feed passageway 6 in the lower mold 3. The space between the four-component mixing head 22 and the inner surface of the through-hole 40 is sealed by means of a plurality of O-rings 50, as shown in FIG. 1.

The method of molding a differential property polyurethane component, such as a two-color component where the surface and interior portions have different colors, by RIM, using the apparatus described above is discussed below in terms of the sequence of steps involved.

(1) Open the mold 1 and apply a mold release agent to the cavity surface 5 defined by the upper mold 2 and lower mold 3.

(2) Set the core 46 of a steering wheel 45 in the lower mold 3; then close the mold 1 to form the cavity 4 while, at the same time, the vacuum box 11 is closed airtight.

(3) Operate the vacuum pump 18 to produce a suitable degree of vacuum within the vacuum box 11 and evacuate the interior of the cavity 4 via the venthole 7.

(4) With the cavity 4 being evacuated continuously as shown in FIG. 1, a surface forming RIM polyurethane material U1 is prepared in the manner described below and a small amount of it is injected into the cavity 4 through the nozzle 25. First, the spool 28 is retracted and the polyol component, the isocyanate component and the fourth component (i.e., a first colorant) are delivered into the mixing compartment through the nozzle member 31, the nozzle member 32 and the nozzle member 34, respectively. These components are then mixed by impingement to prepare the surface forming RIM polyurethane material U1. In this case, the third component is not delivered into the mixing compartment 30.

However, in the case where a mold release agent is incorporated in the surface area forming operation, the mold release agent applying step (1) may be omitted.

Figure 2:
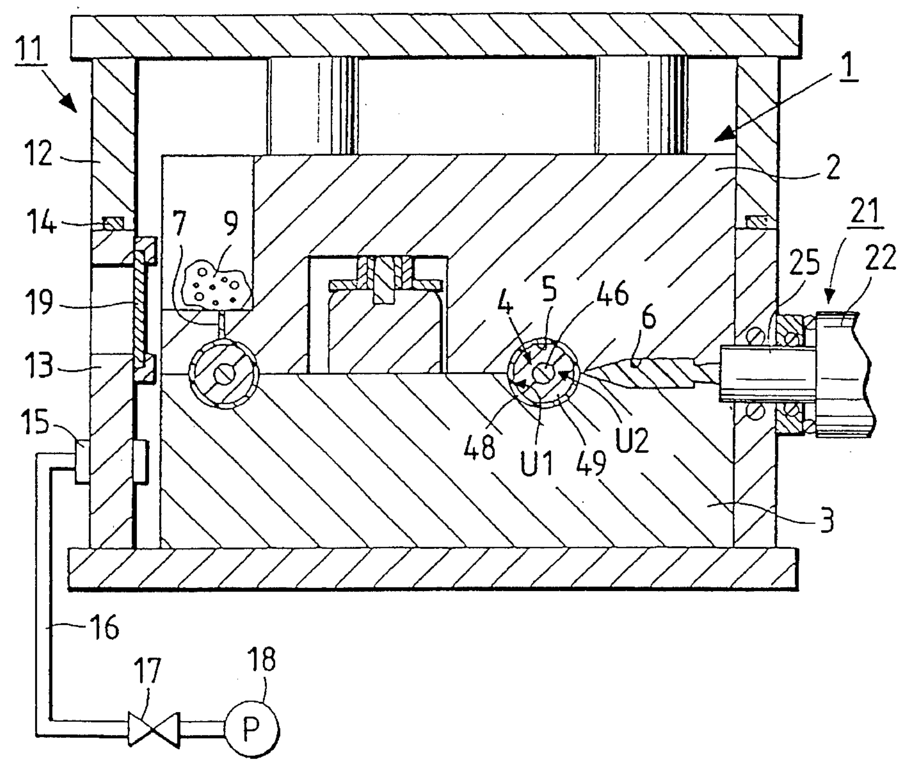
FIG. 2 is a cross-sectional view showing the step of forming the interior of the polyurethane coating in the embodiment of FIG. 1.

(5) With the cavity 4 being evacuated continuously as shown in FIG. 2, an interior forming RIM polyurethane material U2 is prepared in the manner described below and injected into the cavity 4 through the nozzle 25. In this case, the delivery of the fourth component in the previous step is ceased when a predetermined amount has been delivered. Then, with the polyol and isocyanate components being delivered continuously, a second colorant, as the third component, is pumped into the mixing compartment 30 through the nozzle member 33. The respective components are then mixed by impingement to prepare the interior forming RIM polyurethane material U2. In the embodiment under consideration, this interior forming RIM polyurethane material U2 is substantially free of a blowing agent.

The injected interior forming RIM polyurethane material U2 will fill the cavity 4 in the following matter. First, in the part of the material U2 which is distant from the cavity face 5, the gas inherently involved in U2 will boil up under vacuum, thus forming a core portion of high blow ratio. In the part of the material U2 which is to be close to the cavity face 5, a dense self-skin producing layer of low blow ratio is formed by the degasifying action in a vacuum atmosphere. Formed in this manner is an interior 49 that consists of the core and the self-skin producing layer. It should be noted that the flowing tip of the material U2 will blow out of the venthole 7 in a small amount, thus producing a blowout portion 9.

(6) After confirming that the surface forming RIM polyurethane material U1 and the interior forming RIM polyurethane material U2 have cured, the mold 1 is opened and, at the same time, the vacuum box 11 is opened. Finally, the steering wheel 45 with a polyurethane coating 47 is taken out of the mold and the blowout portion 9 is removed.

Figure 3:
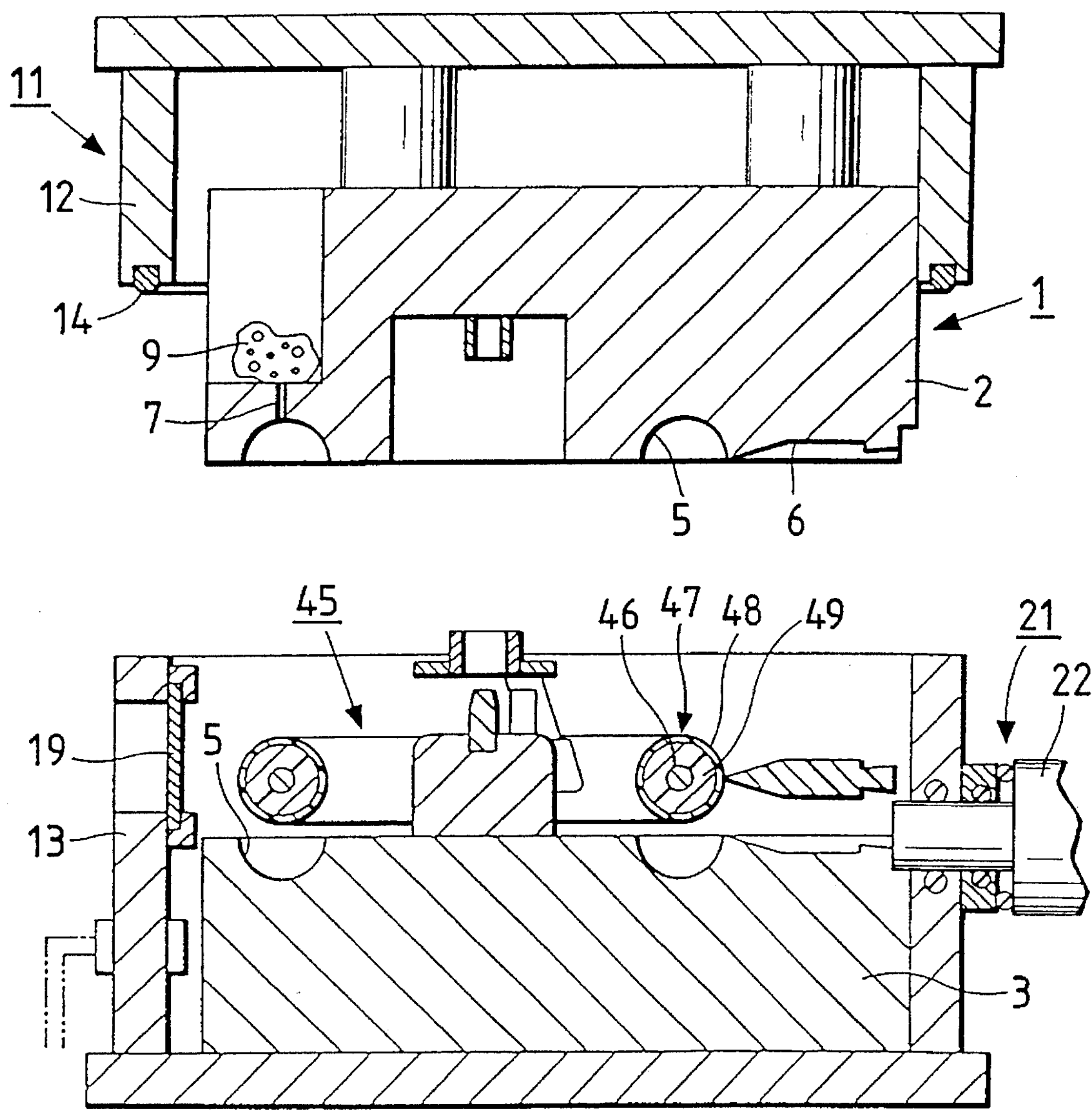
FIG. 3 is a cross-sectional view showing the step of removing the molded part.
Figure 4:
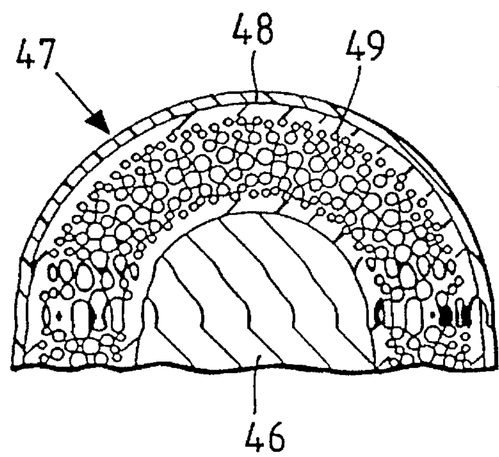
FIG. 4 is a cross-sectional view of the polyurethane coating molded in two colors.

The two-color polyurethane coating 47 thus produced by RIM is characterized in that the surface area 48 is adequately tinted with the first colorant which is admixed as the fourth component with the surface forming RIM polyurethane material U1; furthermore, as shown in FIGS. 3 and 4, the surface area 48 forms a thin film that covers the entire surface of the interior 49 on account of its excellent masking ability and, hence, the steering wheel 45 provided with the polyurethane coating 47 can be sold as such on the market. Therefore, according to the embodiment under consideration, the conventional process of applying a colorant to the cavity surface 5 prior to molding can be omitted.

The present inventors conducted tests in order to investigate how the evacuation of the cavity 4 and the amount of colorant to be admixed with the surface forming polyurethane material U1 should be adjusted to ensure that the surface area 48 of the polyurethane coating 47 molded by means of the molding machine shown in FIGS. 1 to 7 will cover the entire surface of the interior 49. The core 46 of the steering wheel employed had a circumference of 120 cm.

In the first test, the degree of vacuum in the cavity 4 was set at five levels 10, 14, 34, 46 and 67 Torr, and the necessary molding components were injected by the following procedure for the respective cases.

(i) The surface forming RIM polyurethane material U1 that was composed by mixing the first colorant (i.e., the fourth component), polyol component and isocyanate component in a weight ratio of 1:10:5 was injected in an amount of 50 g;

(ii) Subsequently, the interior forming RIM polyurethane material U2 that was composed by mixing the second colorant (i.e., the third component), polyol component and isocyanate component in a weight ratio of 1:10:5 was injected in an amount of 400 g;

(iii) Thereafter, the two feeds were blown and cured to produce molded parts.

The polyol component was a polyether-base polyol produced by Sanyo Chemical Industries Ltd. under the trade name "FA-760" (av. mol. wt. ca. 5,000), and the isocyanate component was a methyl diisocyanate (MDI) prepolymer produced by Nippon Polyurethane Industry Co., Ltd. under the trade name "COLLONATE 1051". The respective colorants were prepared by mixing the associated pigments (6 parts by weight) with the above-mentioned polyol component (9 parts by weight).

In the present invention, a polyether-base polyol, a polyester-base polyol, a polyacryl-base polyol, polyepoxy-base polyol or polybutadiene-base polyol can be used as a polyol component. Further, MDI (methyl diisocyanate), TDI (tolylene diisocyanate), NDI (naphtalene diisocyanate), TODI (tolidine diisocyanate) or XDI (xylene siisocyanate) can be used as a isocyanate component.

Figure 8:
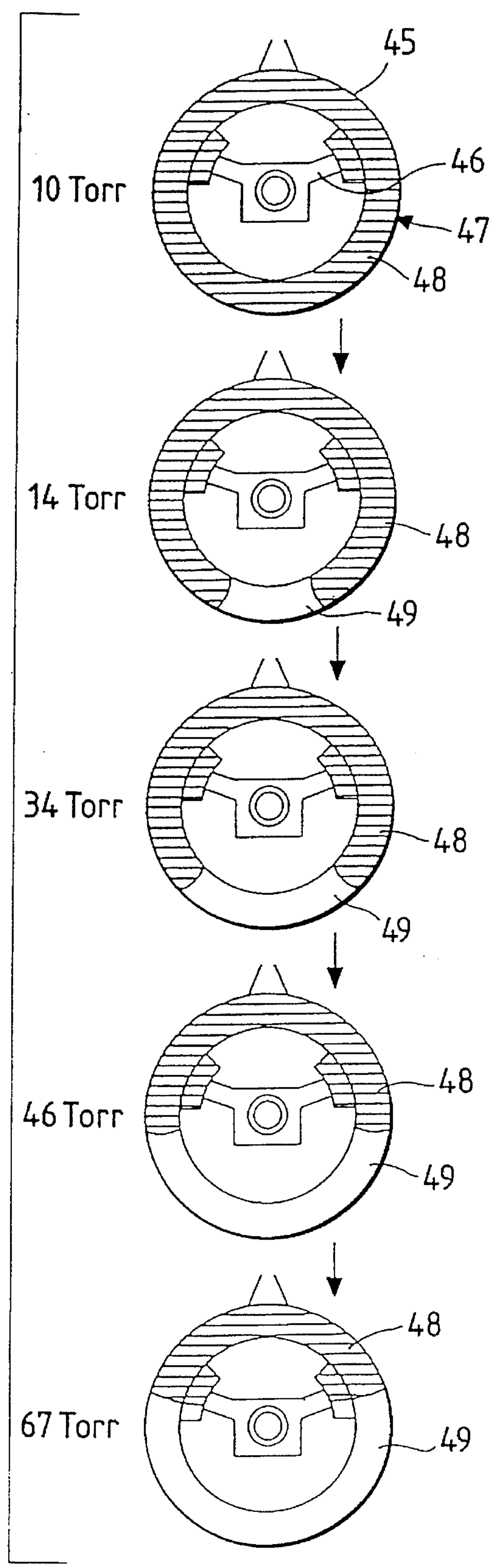
FIG. 8 illustrates the results of the test conducted in order to investigate the relationship between the length of the surface area of the polyurethane coating and the degree of vacuum in the mold cavity for the case where the surface forming RIM polyurethane material was injected in an amount of 50 g.
Figure 10:
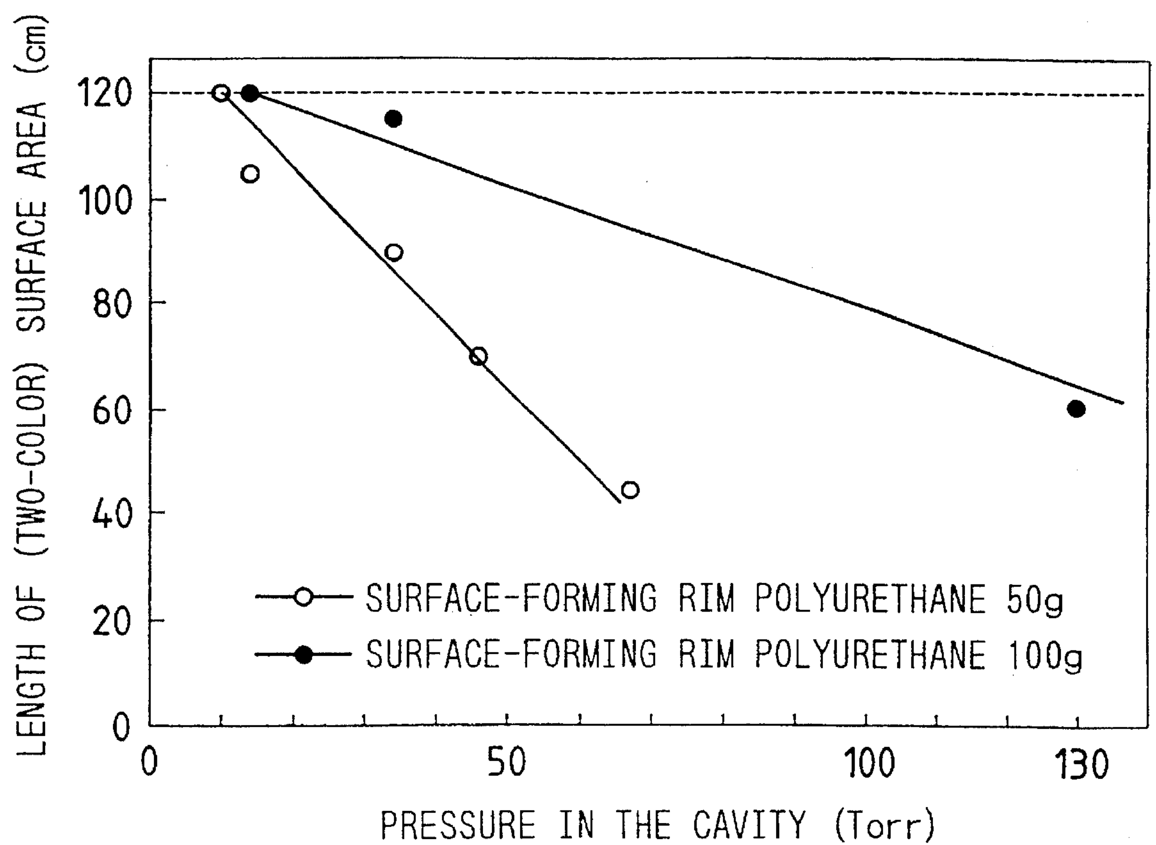
FIG. 10 is a graph plotting the test results shown in FIG. 8 together with those shown in FIG. 9.

The results of the first test are shown in FIGS. 8 and 10. The surface area 48 could cover the entire circumference of the interior 49 when the degree of vacuum in the cavity 4 was 10 Torr. However, when the degree of vacuum was greater than 14 Torr, the surface area 48 could cover only part of the interior 49. Furthermore, the higher the pressure in the cavity 4, the shorter the surface area 48 (namely, the two-color part). This is probably due to the surface forming RIM polyurethane material U1 being scattered within the cavity 4 at higher pressures.

In the second test, the degree of vacuum in the cavity 4 was set at three levels, 14, 34 and 130 Torr, and the necessary molding components were injected by the following procedure for the respective cases.

(i) The surface forming RIM polyurethane material U1 of the same composition as in the first test were injected in an amount of 100 g;

(ii) Immediately after, the interior forming RIM polyurethane material U2 of the same composition as in the first test were injected in an amount of 350 g;

(iii) Thereafter, the two feeds were blown and cured to produce molded parts.

Figure 9:
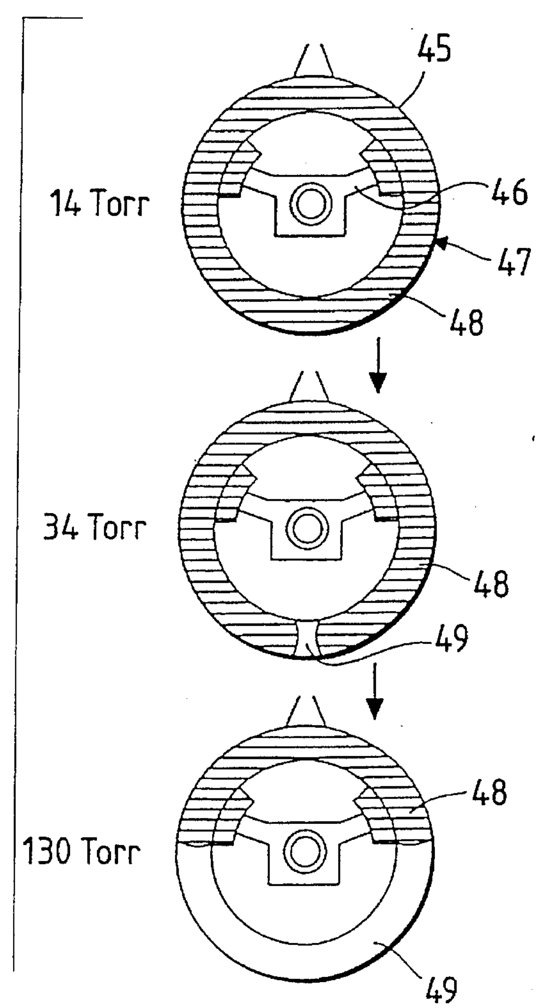
FIG. 9 illustrates the results of the test conducted in order to investigate the relationship between the length of the surface area of the polyurethane coating and the degree of vacuum in the mold cavity for the case where the surface forming RIM polyurethane material was injected in an amount of 100 g.

The results of the second test are shown in FIGS. 9 and 10. The surface area 48 could cover the entire circumference of the interior 49 even when the degree of vacuum in the cavity 4 was 14 Torr. At higher pressures, the surface area 48 covering became smaller at a lower rate than in the first test.

The tests under consideration concern a steering wheel of large circumference, so in the case of molding smaller parts, it is anticipated that complete products can be provided even if the degree of vacuum in the cavity is low or if the surface forming RIM polyurethane material is injected in a small amount.

However, the surface forming RIM polyurethane material and/or the interior forming RIM polyurethane material may be varied in accordance with a surface area, volume, configuration (length, thickness) and so on of the components to be produced or in accordance with a thickness of the surface layer to be required.

Figure 11:
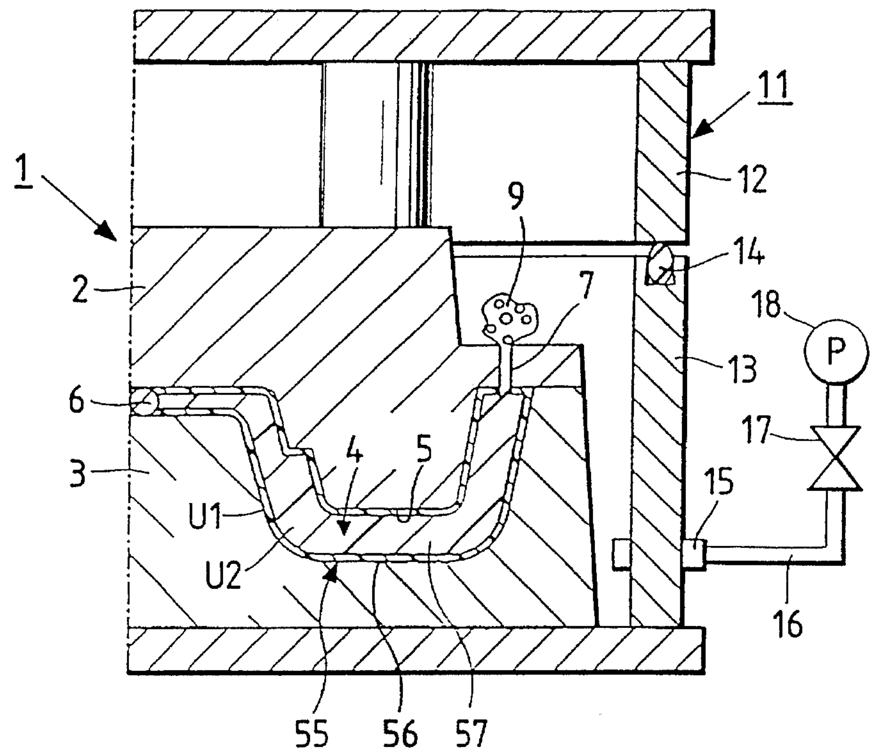
FIG. 11 is a cross-sectional view showing the two-color molding of a steering wheel pad in a second embodiment of the present invention.

In a second embodiment of the present invention, the method of the present invention provides a molded two-color pad for a steering wheel by RIM as described with reference to FIGS. 11 and 12. The molding machine to be used in this second embodiment differs from that which is used in the first embodiment only in terms of the shape of machine parts (e.g., cavity 4) and the construction of the mixing head to be described below. The machine parts that are shown in FIGS. 11 and 12 and which are the same as those used in the first embodiment are identified by like numerals and will not be described in detail.

Figure 12:
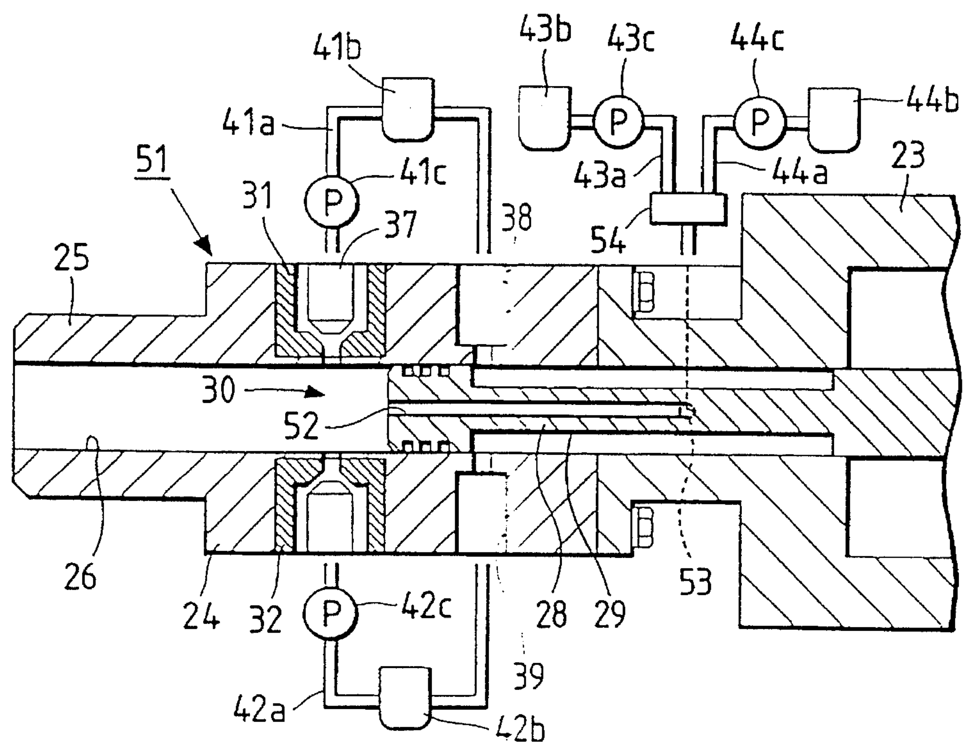
FIG. 12 is a cross-sectional view of the mixing head used in the molding of the pad.

In the second embodiment, a three- component mixing head that is generally indicated by 51 in FIG. 12 is to be employed. This three- component mixing head 51 does not have nozzle members 33 and 34 and, instead, an auxiliary hole 52 for delivery of the third component is provided in the center of the spool 28. The front end of the auxiliary hole 52 opens to the tip face of the spool 28 whereas the rear end of the same hole opens at a point halfway on the circumference of the spool 28. The rear part of the body 24 has a feed hole 53 formed that will communicate with the opening at the rear end of the auxiliary hole 52 only at the time the spool 28 is retracted. The feed hole 53 is connected via a switch valve 54 to the tank **43*b* and pump 43*c* for the third component, as well as to the tank 44*b* and pump 44*c* for the fourth component. Tank 43*b* and pump 43*c* are connected by the hose 43*a* whereas tank 44*b* and pump 44*c* are connected by the hose 44*a*; the combination of tank 43*b* and pump 43*c* is selectively operable with respect to the combination of tank 44*b* and 44*c*.**

The method of molding a two-color polyurethane part by RIM in the second embodiment under discussion is intended to mold a pad 55 consisting of the surface area 56 and the interior 57. It differs from the molding method of the first embodiment only in the following point. Prior to molding, the switch valve 54 is brought to the side connected to the tank **44*b* of the fourth component, so that a mixture of a mold release agent and the first colorant (both as the fourth component) is charged to that part of the auxiliary hole 52 where it is adjacent to the exit portion of the mixing compartment 30. Thereafter, the switch valve 54 is brought to the side connected to the tank 43*b*** of the second colorant as the third component.

When RIM is conducted with the molding machine preset in the manner described above, the polyol component, the isocyanate component and the fourth component preliminarily charged into the auxiliary hole 52 are delivered to the mixing compartment 30, where they are mixed by impingement to form the surface forming RIM polyurethane material U1, which is thereafter injected into the cavity 4. As in the first embodiment, the injected surface forming RIM polyurethane material U1 provides a thin-film deposit on the cavity surface 5, thereby forming the surface area 56.

If the fourth component is no longer present in the auxiliary hole 52, the third component will be delivered spontaneously and, hence, the three components (i.e., the third component and the polyol as well as isocyanate components) are similarly mixed by impingement to form the interior forming RIM polyurethane material U2, which is then injected into the cavity 4. As in the first embodiment, the injected interior forming RIM polyurethane U2 will foam and become fluid to form the interior 57.

Hence, according to the second embodiment in which the surface area 56 of the molded pad 55 contains the mold release agent and the first colorant, the conventional step of applying both the release agent and the colorant to the cavity surface 5 before molding starts, can be omitted.

It is further noted that the present invention is in no way limited to the two embodiments described above. The present invention has been described with respect to a molded product of two-colors however one skilled in the art will appreciate that the invention is not limited to variable colors but may be useful in providing parts of variable physical properties other than color. Accordingly, various modifications may be made, without departing from the spirit of the present invention. The method according to the present invention enables, at a minimum, a two-color part, readily molded from polyurethane by RIM, with the interior of the part being covered by a thin film on its surface area.

According to the method of the present invention, application of a mold release agent or a colorant to the cavity surface before molding starts can be omitted and a greater latitude is provided for altering various characteristics including color, hardness and endurance.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of molding a polyurethane part having differential skin and core properties by a RIM technique, which comprises the steps of:

injecting a surface forming RIM polyurethane first material free of foaming agent into the cavity of a mold under vacuum in an amount sufficient to coat the inner surface of the mold cavity; and injecting under vacuum an interior forming RIM polyurethane second material free of foaming agent into the first material, in an amount sufficient to fill the mold cavity for subsequent molding by RIM, wherein the vacuum degasses the first material and foams the second material.

2. A method according to claim 1, wherein said surface forming RIM polyurethane material contains at least one auxiliary component selected from among a colorant, a mold release agent and a catalyst.

3. A method according to claim 1, wherein said interior forming RIM polyurethane material contains at least one auxiliary component selected from among a colorant, a mold release agent and a catalyst.

4. A method according to claim 1, wherein said surface forming RIM polyurethane material contains a polyol component, an isocyanate component and at least one auxiliary component selected from among a colorant, a mold release agent and a catalyst.

5. A method according to claim 4, wherein said interior forming RIM polyurethane material contains a polyol component and an isocyanate component.

6. A method according to claim 4, wherein said interior forming RIM polyurethane material contains a polyol component, an isocyanate component and at least one auxiliary component selected from among a colorant, a mold release agent and a catalyst.

* * * * *